United States Patent
Hsiao et al.

(10) Patent No.: US 9,618,673 B2
(45) Date of Patent: Apr. 11, 2017

(54) TRANSPARENT DISPLAY DEVICE AND TRANSPARENT BACKLIGHT MODULE

(71) Applicant: Shenzhen China Star Optoelectronics Technology Co., Ltd., Guangdong (CN)

(72) Inventors: Yu-Chun Hsiao, Guangdong (CN); Shih Hsiang Chen, Guangdong (CN); Guofu Tang, Guangdong (CN); Quan Li, Guangdong (CN); Chengling Lv, Guangdong (CN); Chaofan Guo, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 163 days.

(21) Appl. No.: 14/411,610

(22) PCT Filed: Nov. 18, 2014

(86) PCT No.: PCT/CN2014/091341
§ 371 (c)(1),
(2) Date: Dec. 29, 2014

(87) PCT Pub. No.: WO2016/074255
PCT Pub. Date: May 19, 2016

(65) Prior Publication Data
US 2016/0139315 A1    May 19, 2016

(30) Foreign Application Priority Data

Nov. 13, 2014 (CN) .......................... 2014 1 0640229

(51) Int. Cl.
*F21V 7/04* (2006.01)
*F21V 8/00* (2006.01)
*G02F 1/1335* (2006.01)

(52) U.S. Cl.
CPC ........... *G02B 6/001* (2013.01); *G02B 6/0006* (2013.01); *G02F 1/133605* (2013.01); *G02F 1/133621* (2013.01)

(58) Field of Classification Search
CPC ... G02B 6/001; G02B 6/006; G02F 1/133605; G02F 1/133621
USPC ......................................................... 362/554
See application file for complete search history.

(56) References Cited

U.S. PATENT DOCUMENTS

2007/0195519 A1*  8/2007  Shin ..................... G02B 6/0055
                                                    362/125
2010/0214208 A1*  8/2010  Itoh ..................... G02B 6/0001
                                                    345/102

\* cited by examiner

*Primary Examiner* — Anh Mai
*Assistant Examiner* — Hana Featherly

(57) ABSTRACT

The present invention discloses a display device and a backlight module. The display device includes a display panel and a backlight module. The display panel is used for displaying images and passing light rays. The backlight module includes a light source and a light source providing board. The light source providing board is used for providing first light rays and passing second light rays. The light source providing board includes a light ray input interface, a light ray providing unit, and a light ray transmittance channel. The present invention can make a viewer see an object behind the display device.

14 Claims, 5 Drawing Sheets

TRANSPARENT DISPLAY DEVICE AND TRANSPARENT BACKLIGHT MODULE

RELATED APPLICATIONS

This application is a National Phase of PCT Patent Application No. PCT/CN2014/091341 having International filing date of Nov. 18, 2014, which claims the benefit of priority of Chinese Patent Application No. 201410640229.1 filed on Nov. 13, 2014. The contents of the above applications are all incorporated by reference as if fully set forth herein in their entirety.

BACKGROUND OF THE INVENTION

1. Field of the Invention

The present invention relates to a display technology, and more particularly, to a display device and a backlight module.

2. Description of Prior Art

Traditional display panels are not transparent. That is, light rays cannot go through the display panel.

For example, LCD (liquid crystal display) backlight modules have first backlight plates disposed, which are not transparent.

Further, OLED (organic light emitting diode) displays includes second backlight plates at their back sides, which are also not transparent.

Therefore, a viewer cannot see an object or a scene behind the display panel through the display panel.

Therefore, there is a need to provide a new technical scheme for solving above technical problems.

SUMMARY OF THE INVENTION

The objective of the present invention is to provide a display device and a backlight module, capable of making a viewer see an object or a scene behind the display device through the display device.

To solve above problems, the technical schemes of the present invention are provided below.

A display device comprises: a display panel comprising at least two pixel units, the display panel being used for displaying images and passing first light rays and second light rays irradiating the display panel; and a backlight module for providing the first light rays for the display panel, the display panel and the backlight module being overlapped and combined as one unity, the backlight module comprising: a light source for generating the first light rays; and a light source providing board, the light source being disposed at one side of the light source providing board, the light source providing board being used for receiving the first light rays generated by the light source and providing the first light rays for each pixel unit on the display panel, the light source providing board being further used for passing the second light rays irradiating the surface of the light source providing board, wherein the light source providing board comprises: at least two light ray input interfaces for receiving the first light rays generated by the light source, the light ray input interface being connected with the light source; at least two light ray providing unit, the light ray providing unit being at a position on the light source providing board corresponding to the position of the pixel unit on the display panel; and at least one light ray transmittance channel connected with the light ray output interface, for transmitting the first light rays emitted from the light source to the light ray output interface; wherein the light ray providing unit comprises: a light ray output interface for changing the propagation direction of the first light rays transmitted by the light ray transmittance channel such that the first light rays outputted from the light ray output interface irradiate the pixel unit of the display panel; wherein the light source providing board has a light transmittance, and the light transmittance is adopted within a scope of 10% to 99.9%.

In the display device, the light ray transmittance channel is an optical fiber, and the optical fiber has a coupling interface, which is coupled with the light ray output interface, and wherein the light ray output interface comprises: a first inclined plane, the first inclined plane and a plane where the light source providing board is located having an angle formed therebetween, the inclined plane being used for reflecting the first light rays transmitted by the optical fiber to the pixel unit; the first inclined plane being coupled with the coupling interface; the optical fiber and the light ray output interface having at least one opening therebetween, the opening being used for outputting the first light rays to the light ray output interface.

A display device comprises: a display panel comprising at least two pixel units, the display panel being used for displaying images and passing first light rays and second light rays irradiating the display panel; and a backlight module for providing the first light rays for the display panel, the display panel and the backlight module being overlapped and combined as one unity, the backlight module comprising: a light source for generating the first light rays; and a light source providing board, the light source being disposed at one side of the light source providing board, the light source providing board being used for receiving the first light rays generated by the light source and providing the first light rays for each pixel unit on the display panel, the light source providing board being further used for passing the second light rays irradiating the surface of the light source providing board, wherein the light source providing board comprises: at least two light ray input interfaces for receiving the first light rays generated by the light source, the light ray input interface being connected with the light source; at least two light ray providing unit, the light ray providing unit being at a position on the light source providing board corresponding to the position of the pixel unit on the display panel; and at least one light ray transmittance channel connected with the light ray output interface, for transmitting the first light rays emitted from the light source to the light ray output interface.

In the display device, the light ray providing unit comprises: a light ray output interface for changing the propagation direction of the first light rays transmitted by the light ray transmittance channel such that the first light rays outputted from the light ray output interface irradiate the pixel unit of the display panel.

In the display device, the light ray transmittance channel is an optical fiber, and the optical fiber has a coupling interface, which is coupled with the light ray output interface.

In the display device, the light ray output interface comprises: a first inclined plane, the first inclined plane and a plane where the light source providing board is located having an angle formed therebetween, the inclined plane being used for reflecting the first light rays transmitted by the optical fiber to the pixel unit; the first inclined plane being coupled with the coupling interface.

In the display device, the optical fiber and the light ray output interface have at least one opening therebetween, and the opening is used for outputting the first light rays to the light ray output interface.

In the display device, the coupling interface and the light ray output interface have a light conductive glue disposed therebetween, the light conductive glue is a transparent glue, and the light conductive glue is used for making the first light rays provided by the optical fiber smoothly transit to the light ray output interface from the coupling interface so as to reduce loss of the first light rays.

In the display device, the coupling interface and the light ray output interface further have a light leakage preventing layer disposed therebetween, which is a black rubber layer, and the light leakage preventing layer is coated on an external surface of a gap between the coupling interface and the light ray output interface 1013 where the light conductive glue is located at.

In the display device, the light source providing board has a barrier member disposed therein, and the barrier member is used for blocking the optical fiber so as to fastening the optical fiber.

In the display device, the light source providing board has a light transmittance, and the light transmittance is adopted within a scope of 10% to 99.9%.

A backlight module comprises: a light source for generating the first light rays; and a light source providing board, the light source being disposed at one side of the light source providing board, the light source providing board being used for receiving the first light rays generated by the light source and providing the first light rays for each pixel unit on the display panel, the light source providing board being further used for passing the second light rays irradiating the surface of the light source providing board, wherein the light source providing board comprises: at least two light ray input interfaces for receiving the first light rays generated by the light source, the light ray input interface being connected with the light source; at least two light ray providing unit, the light ray providing unit being at a position on the light source providing board corresponding to the position of the pixel unit on the display panel; and at least one light ray transmittance channel connected with the light ray output interface, for transmitting the first light rays emitted from the light source to the light ray output interface.

In the backlight module, the light ray providing unit comprises: a light ray output interface for changing the propagation direction of the first light rays transmitted by the light ray transmittance channel such that the first light rays outputted from the light ray output interface irradiate the pixel unit of the display panel.

In the backlight module, the light ray transmittance channel is an optical fiber, and the optical fiber has a coupling interface, which is coupled with the light ray output interface.

In the backlight module, the light ray output interface comprises: a first inclined plane, the first inclined plane and a plane where the light source providing board is located having an angle formed therebetween, the inclined plane being used for reflecting the first light rays transmitted by the optical fiber to the pixel unit; the first inclined plane being coupled with the coupling interface.

In the backlight module, the optical fiber and the light ray output interface have at least one opening therebetween, and the opening is used for outputting the first light rays to the light ray output interface.

In the backlight module, the coupling interface and the light ray output interface have a light conductive glue disposed therebetween, the light conductive glue is a transparent glue, and the light conductive glue is used for making the first light rays provided by the optical fiber smoothly transit to the light ray output interface from the coupling interface so as to reduce loss of the first light rays.

In the backlight module, the coupling interface and the light ray output interface further have a light leakage preventing layer disposed therebetween, which is a black rubber layer, and the light leakage preventing layer is coated on an external surface of a gap between the coupling interface and the light ray output interface 1013 where the light conductive glue is located at.

In the backlight module, the light source providing board has a barrier member disposed therein, and the barrier member is used for blocking the optical fiber so as to fastening the optical fiber.

In the backlight module, the light source providing board has a light transmittance, and the light transmittance is adopted within a scope of 10% to 99.9%.

Compared to conventional skills, the present invention make a viewer able to see an object or a scene behind the display device through the display device.

To make above content of the present invention more easily understood, it will be described in details by using preferred embodiments in conjunction with the appending drawings.

DETAILED DESCRIPTION OF THE PREFERRED EMBODIMENTS

The term "embodiment" used in the specification means serving as an example, instance, or illustration. In addition, the articles "a" and "an" used in the specification and the appended claims should typically be interpreted to mean "one or more" but refers to the singular form unless specified otherwise or clear from context.

Figure 1:
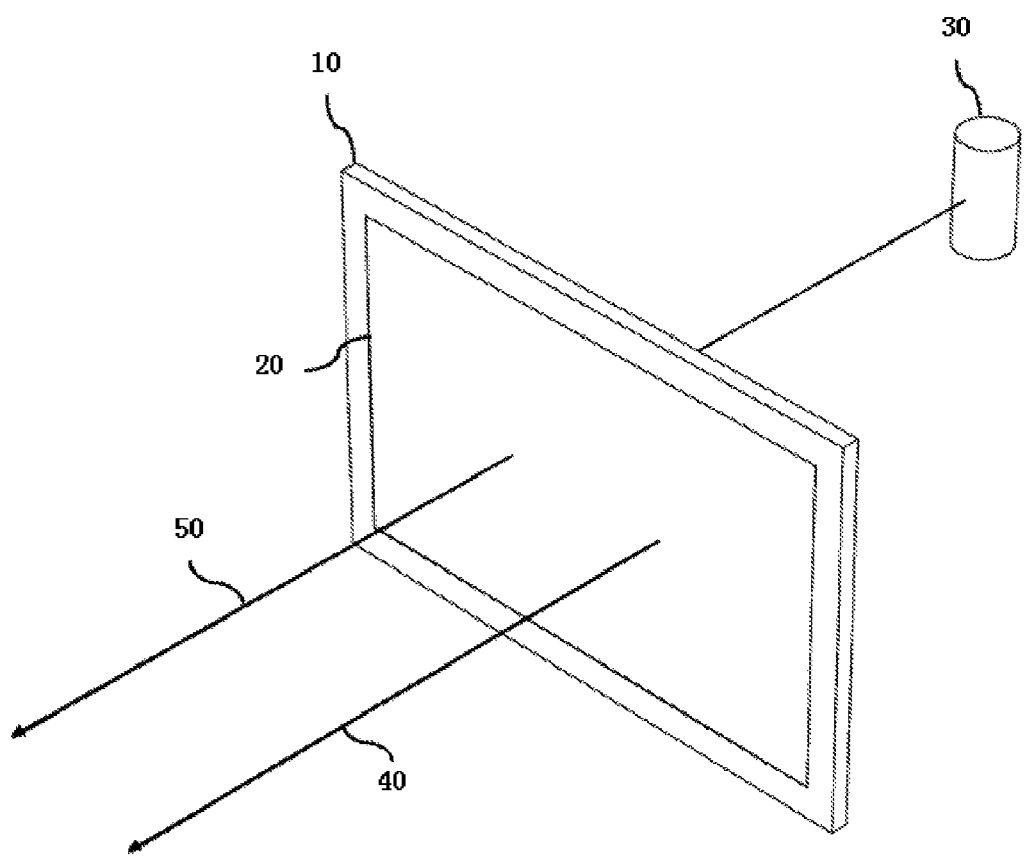
FIG. 1 is a schematic diagram showing how a display device works in accordance with the present invention.
Figure 2:
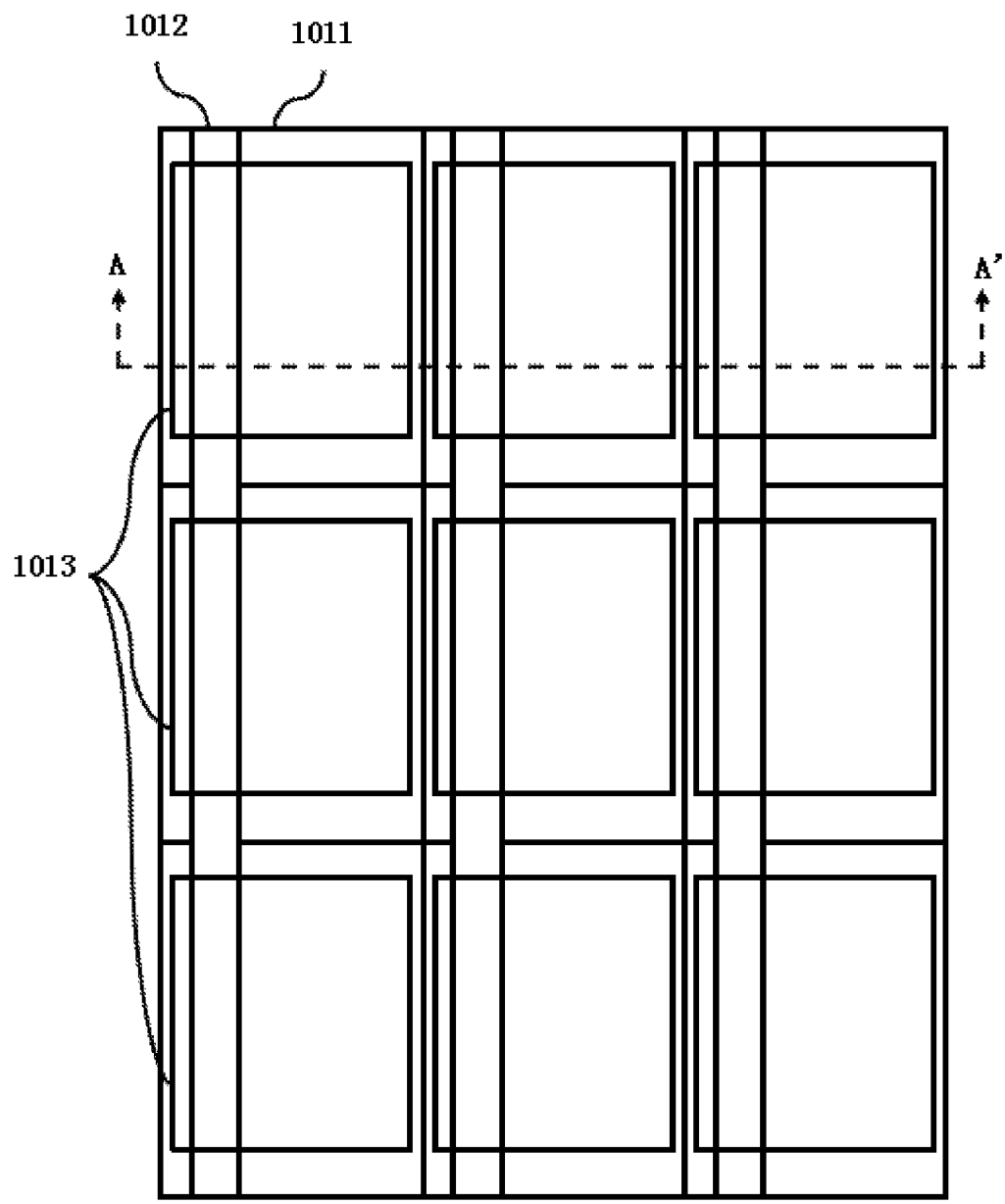
FIG. 2 is a schematic diagram showing a display device in accordance with a first embodiment of the present invention.

Please refer to FIG. 1 and FIG. 2. FIG. 1 is a schematic diagram showing how a display device 10 works in accordance with the present invention. FIG. 2 is a schematic diagram showing a display device 10 in accordance with a first embodiment of the present invention.

The display device 10 of the present invention comprises a display panel 102 and a backlight module, which are overlapped and combined as one unity.

The display panel 102 of the present invention can be a TFT-LCD (thin film transistor liquid crystal display) panel or an OLED (organic light emitting diode) panel. The display panel 102 comprises at least two pixel units 1021.

The display panel 102 has a first surface and a second surface, which are two opposite surfaces. The display panel 102 is used for displaying images 20 by way of first light rays 40 and second light rays 50 irradiating the display panel. The second light rays 50 are radiated from an object 30 or reflected by the object 30.

In the present embodiment, the backlight module is transparent or semitransparent. That is, the backlight module has a light transmittance. The backlight module is used for providing the first light rays 40 for the display panel 102. The backlight module comprises a light source and a light source providing board 101.

The light source is used for generating the first light rays 40. The light source providing board 101 has a third surface and a fourth surface, which are two opposite surface. The light source is disposed at one side of the light source providing board 101. The light source providing board 101 is used for receiving the first light rays 40 generated by the light source and providing the first light rays 40 for the display panel 102. The light source providing board 10 is further used for providing the second light rays 50 irradiating the fourth surface of the light source providing board 101.

The light source providing board 101 has a light transmittance, which is a ratio of the light rays passing the light source providing board 101 to the light rays striking on the light source providing board 101, i.e., a radio of the light rays passing the second surface to the light rays striking on the third surface of the light source providing board 101. The light transmittance of the light source providing board 101 may be adopted within a scope of 10% to 99.9%. For example, the light transmittance of the light source providing board 101 may be 11.4%, 14.7%, 15.3%, 17.8%, 19.1%, 22.8%, 24.7%, 26.4%, 29.3%, 32.2%, 36.1%, 39.5%, 42.3%, 43.4%, 46.8%, 48.2%, 50.9%, 63.8%, 66.1%, 69.2%, 72.1%, 75.4%, 77.6%, 79.7%, 82.0%, 84.5%, 86.1%, 88.9%, 90.2%, 93.3%, 95.7%, 97.6%, 99.9%.

The second surface of the display panel 102 is disposed facing the third surface of the light source providing board 101. Specifically, the second surface and the third surface are attached together.

In the present embodiment, the light source providing board 101 further comprises a fifth surface, which is a lateral surface/top surface of the light source providing board 101.

The light source providing board 101 comprises at least two light ray input interfaces, at least two light ray providing units 1011, and at least one light ray transmittance channel.

The light ray input interface is used for receiving the first light rays 40 generated by the light source. The light ray input interface is disposed on the fifth surface. The light ray input interface is connected with the light source.

The light ray providing unit 101 is at a position on the light source providing board 101 corresponding to the position of the pixel unit 1021 on the display panel 102. The light ray providing unit 1011 comprises a light ray output interface 1013.

The light ray output interface 1013 is used for changing the propagation direction of the first light rays 40 transmitted in the light ray transmittance channel such that the first light rays 40 outputted from the light ray output interface 1013 irradiate the pixel unit 1021 of the display panel 102.

The light ray transmittance channel is connected with the light ray output interface 1013. The light ray transmittance channel is used for transmitting the first light rays 40 emitted from the light source to the light ray output interface 1013.

In the present embodiment, the light ray transmittance channel is an optical fiber 1012. The optical fiber 1012 is used for transmitting the first light rays 40. The optical fiber 1012 has a first end and a second end. The first end is located at the fifth surface and is connected with the light source. The second end is connected with the light ray output interface 1013.

In the present embodiment, one optical fiber 1012 provides the first light rays 40 completely for at least two light ray providing units 1011. For example, the optical fiber 1012 provides the first light rays 40 for a row of light ray providing units 1011, wherein the optical fiber 1012 comprises at least two segments, each of which is connected between two adjacent light ray output interfaces 1013, and at least one of the segments is connected with the light ray output interface 1013 and the light ray input interface. That is so say, the optical fiber 1012 makes at least two light ray providing units 1011 serially connected together in one dimension such that the first light rays 40 are provided completely for the serially connected light ray providing units 1011. The optical fiber 1012 is disposed at one side of the light ray providing unit 1011.

Figure 3:
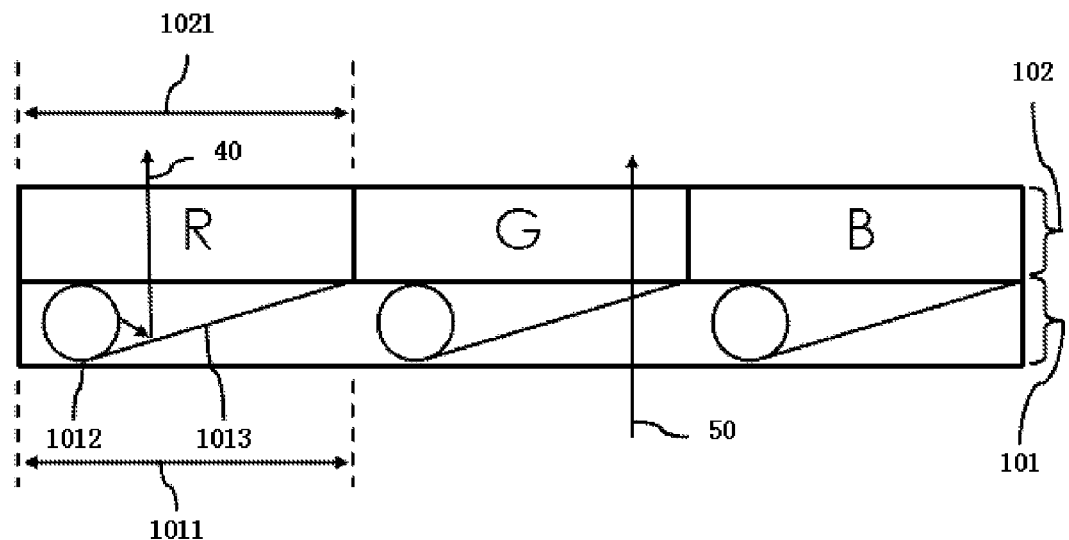
FIG. 3 is a schematic diagram showing a cross-sectional view A-A' in FIG. 2.

Please refer to FIG. 3, which is a schematic diagram showing a cross-sectional view A-A' in FIG. 2.

In the present embodiment, the light ray output interface 1013 comprises an inclined plane, which has a smooth surface. The inclined plane and a plane where the light source providing board 101 is located has an angle formed therebetween. The inclined plane is used for reflecting the first light rays 40 transmitted by the optical fiber 1012 to the pixel unit 1021.

In the present embodiment, the optical fiber 1012 is disposed at one side of the light ray output interface 1013. The optical fiber 1012 is disposed between the inclined plane corresponding to the light ray output interface 1013 and the second surface of the display panel 102. The optical fiber 1012 has a coupling interface, which is coupled to the light ray output interface. The coupling interface can be a plane and also can be a rough face (having convex and concave structures). The coupling interface and the light ray output interface 1013 have a light conductive glue disposed therebetween. The light conductive glue is a transparent glue. The light conductive glue is used for making the first light rays provided by the optical fiber 1012 smoothly transit to the light ray output interface 1013 from the coupling interface so as to reduce loss of the first light rays. In addition, the coupling interface and the light ray output interface 1013 also have a light leakage preventing layer disposed therebetween, which is a black rubber layer. The light leakage preventing layer is coated on an external surface of a gap between the coupling interface and the light ray output interface 1013 where the light conductive glue is located at. Since the light conductive glue is a colloid, the light conductive glue may form a smooth face on the external surface of the gap after the light conductive glues is disposed between the coupling interface and the light ray output interface 1013. Since the light leakage preventing layer is disposed on the smooth face of the light conductive glue, the inner face of the light conductive glue and the light leakage preventing layer accordingly form a mirror face. The mirror face is used for making the first light rays transmitting to the outer side of the light conductive glue reflect back to the inner side of the light conductive glue (then entering the light ray output interface 1013), thereby effectively reducing loss of the first light rays.

The inclined plane may be configured as a rough surface. For example, the inclined plane has scattering particles disposed thereon. The scattering particles are used for scattering the first light rays 40 emitted from the inclined plane (i.e., emitted in scattering). In this way, the first light rays 40 can uniformly irradiate the pixel unit 1021 corresponding to the light ray providing unit 1011 where the inclined plane is located at. The scattering particles can be distributed non-uniformally on the inclined plane. The scattering particles may have irregular shapes. The scattering particles may have at least one sharp corner. Specifically, the scattering particles are a polyhedron with irregular shape. The scattering particles are transparent or semitransparent. The scattering particles can be transparent crystal. In this circumstance, the scattering particles may be disposed on the inclined plane by adhering them thereon. Alternatively, the scatting particles and the light ray output interface 1013 are made of the same material, and meanwhile the scattering particles are protrusions on the light ray output interface 1013. The protrusions may be formed by etching the inclined plane to form dents.

Since one segment of the optical fiber 1012 is connected with two adjacent light ray output interfaces 1013, the scattering particles on the inclined plane benefits inputting the first light rays 40 from one segment of the optical fiber 1012 to another segment. That is to say, the scattering particles are helpful for preventing the first light rays 40 inputted to said another segment of the optical fiber 1012 from entirely or excessively reflecting to a corresponding pixel unit 1021 by the inclined plane. That is, the scattering particle are helpful for avoiding too less first light rays 40 inputted to said another segment of the optical fiber 1012, thereby assuring that each pixel unit 1021 obtains substantially the same amount of the first light rays 40.

Figure 4:
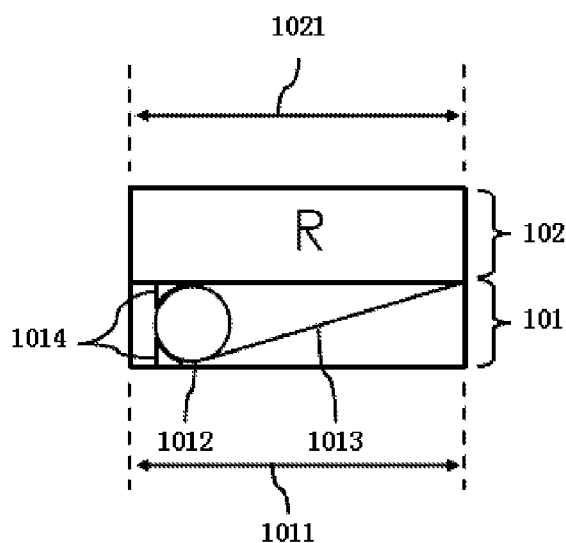
FIG. 4 is a schematic diagram showing a display device in accordance with a second embodiment of the present invention.

Please refer to FIG. 4, which is a schematic diagram showing a display device in accordance with a second embodiment of the present invention. The present embodiment is similar to the afore-described first embodiment and the differences therebetween are described below.

The light source providing board 101 has a barrier member 1014 disposed therein. The barrier member 1014 is used for blocking the optical fiber 1012 so as to fastening the optical fiber. Fastening the optical fiber 1012 by using the barrier member 1014 is to avoid the loosening of the coupling interface and the light ray output interface 1013 caused by the movement of the optical fiber 1012, thereby preventing the gap between the coupling interface and the light ray output interface 1013 from increasing. Therefore, light leaking is avoided and loss of the first light rays is reduced.

By above-described technical features, the light source providing board 101 providing the first light rays 40 for the display panel 102 can pass a certain amount of the second light rays 40. Accordingly, a viewer can see the object 30 behind the display device 10 through the display device 10. When the display device 10 displays the images 20, the images 20 and a scene corresponding to the object 30 behind the display device 10 are overlapped.

Figure 5:
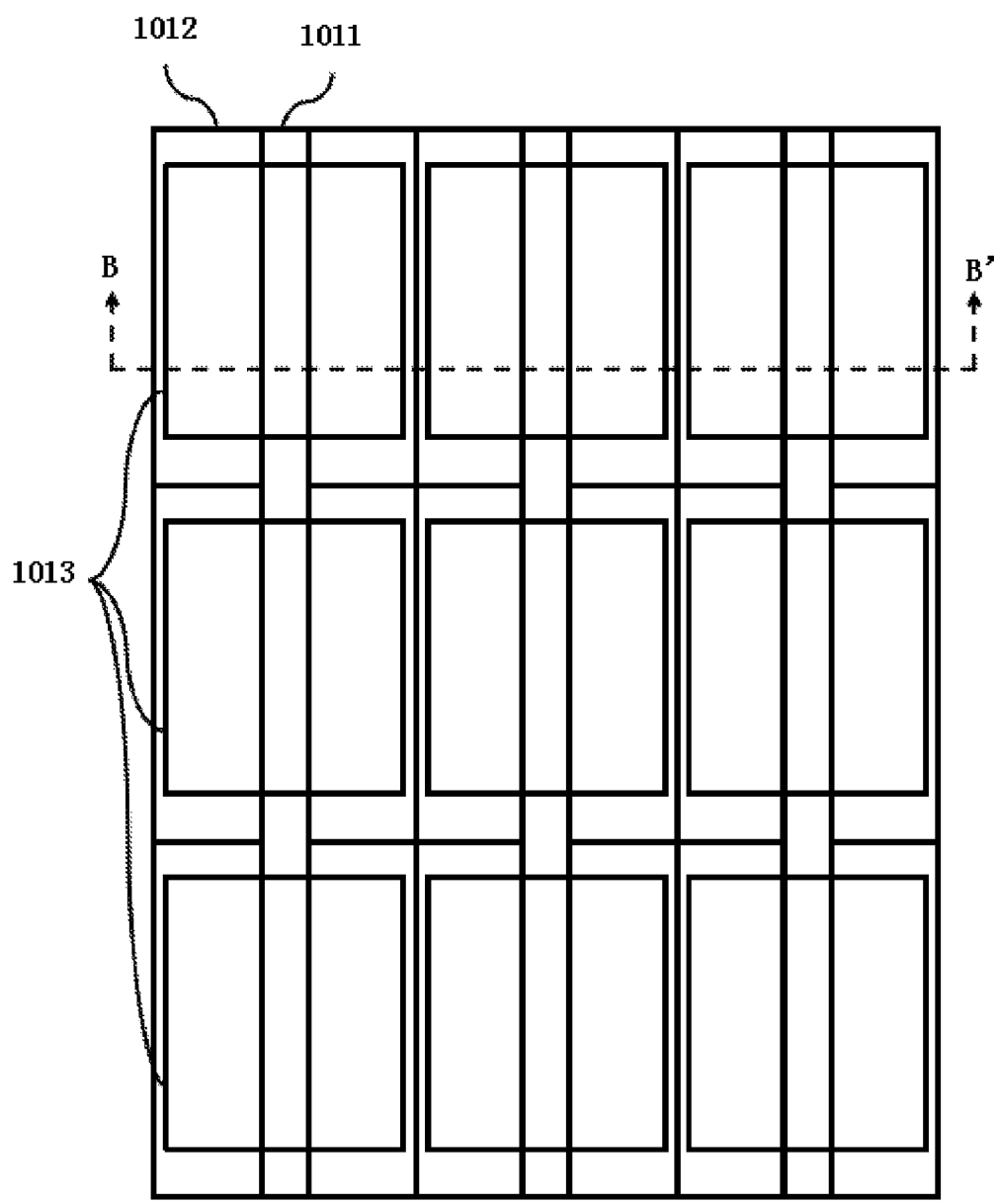
FIG. 5 is a schematic diagram showing a display device in accordance with a third embodiment of the present invention.
Figure 6:
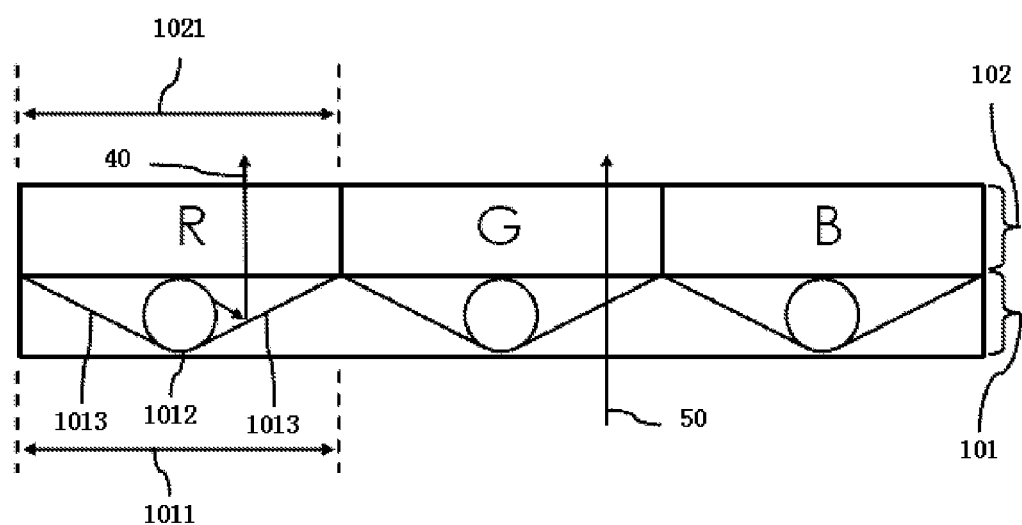
FIG. 6 is a schematic diagram showing a cross-sectional view B-B' in FIG. 5.

Please refer to FIG. 5 and FIG. 6. FIG. 5 is a schematic diagram showing a display device in accordance with a third embodiment of the present invention. FIG. 6 is a schematic diagram showing a cross-sectional view B-B' in FIG. 5. The present embodiment is similar to the afore-described first or second embodiment and the differences therebetween are described below.

The optical fiber 1012 is disposed at a middle portion of the light ray providing unit 1011. In the present embodiment, the optical fiber 1012 is disposed between two light ray output interfaces 1013.

Disposing the optical fiber 1012 between the two light ray output interfaces 1013 is helpful for uniformally distributing the first light rays provided by the optical fiber 1012 to the pixel unit 1021, thereby improving the display effect.

In the afore-described first, second, and third embodiments, the light ray output interface 1013 can also be a curved face, which is used for reflecting the first light rays transmitted by the optical fiber 1012 to the pixel unit 1021.

Specifically, the curved face is an outward-curving or convex face. The outward-curving face is used for scattering the first light rays 40 provided by the optical fiber 1012 to the respective regions of the pixel unit 1021.

As with an improvement, the outward-curving face may have scattering particles similar to that in the second embodiment disposed thereon.

Of course, the curved face can also be an inward-curving or concave face. The inward-curving face is used for concentrating the first light rays 40 provided by the optical fiber 1012 to a region (e.g., a middle region) of the pixel unit 1021.

Of course, the light ray output interface 1013 can also be an arbitrary combination of the inclined plane and the curved face. For example, the light ray output interface 1013 comprises at least two of the inclined plane, the outward-curving face, and the inward-curving face.

Despite relative to one or more implementations shown and described the present disclosure, those skilled in the art based on the present specification and drawings will occur upon reading and understanding the equivalent variations and modifications. The present disclosure includes all such modifications and variations, and is limited only by the scope of the appended claims. Particularly with regard to various functions performed by the above-described components, the terms used to describe such components are intended to perform the function (e.g., which is functionally equivalent) corresponding to any component (unless otherwise indicated) of the specified component, even if the structure of the implementation and execution of the function of the present disclosure shown herein disclosed exemplary not structurally equivalent. Additionally, although a particular feature of the present disclosure has been made with respect to certain implementations, only one is open, but this feature may be as given particular application, the purpose of enabling a desired one or more other implementations, or other combinations of features. Moreover, the terms "comprising", "having", "containing", or variants thereof are used in the detailed description or the claims, such a term is intended to direct to the term "comprising" includes similar manner.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A display device, comprising:
    a display panel comprising at least two pixel units, the display panel being used for displaying images and passing first light rays and second light rays irradiating the display panel; and
    a backlight module for providing the first light rays for the display panel, the display panel and the backlight module being overlapped and combined as one unity, the backlight module comprising:

a light source for generating the first light rays; and a light source providing board, the light source being disposed at one side of the light source providing board, the light source providing board being used for receiving the first light rays generated by the light source and providing the first light rays for each pixel unit on the display panel, the light source providing board being further used for passing the second light rays irradiating the surface of the light source providing board, wherein the light source providing board comprises:

at least two light ray input interfaces for receiving the first light rays generated by the light source, the light ray input interface being connected with the light source;

at least two light ray providing unit, the light ray providing unit being at a position on the light source providing board corresponding to the position of the pixel unit on the display panel; and at least one light ray transmittance channel connected with a light ray output interface, for transmitting the first light rays emitted from the light source to the light ray output interface;

wherein the light ray providing unit comprises:

the light ray output interface for changing the propagation direction of the first light rays transmitted by the light ray transmittance channel such that the first light rays outputted from the light ray output interface irradiate the pixel unit of the display panel;

wherein the light source providing board has a light transmittance, and the light transmittance is adopted within a scope of 10% to 99.9%;

wherein the light ray transmittance channel is an optical fiber, and the optical fiber has a coupling interface, which is coupled with the light ray output interface;

wherein the coupling interface and the light ray output interface have a light conductive glue disposed therebetween, the light conductive glue is a transparent glue, and the light conductive glue is used for making the first light rays provided by the optical fiber smoothly transit to the light ray output interface from the coupling interface so as to reduce loss of the first light rays;

wherein the coupling interface and the light ray output interface further have a light leakage preventing layer disposed therebetween, which is a black rubber layer, and the light leakage preventing layer is coated on an external surface of a gap between the coupling interface and the light ray output interface where the light conductive glue is located at.

2. The display device according to claim 1, wherein the light ray output interface comprises:

a first inclined plane, the first inclined plane and a plane where the light source providing board is located having an angle formed therebetween, the inclined plane being used for reflecting the first light rays transmitted by the optical fiber to the pixel unit;

the first inclined plane being coupled with the coupling interface;

the optical fiber and the light ray output interface having at least one opening therebetween, the opening being used for outputting the first light rays to the light ray output interface.

3. A display device, comprising:

a display panel comprising at least two pixel units, the display panel being used for displaying images and passing first light rays and second light rays irradiating the display panel; and a backlight module for providing the first light rays for the display panel, the display panel and the backlight module being overlapped and combined as one unity, the backlight module comprising:

a light source for generating the first light rays; and a light source providing board, the light source being disposed at one side of the light source providing board, the light source providing board being used for receiving the first light rays generated by the light source and providing the first light rays for each pixel unit on the display panel, the light source providing board being further used for passing the second light rays irradiating the surface of the light source providing board, wherein the light source providing board comprises:

at least two light ray input interfaces for receiving the first light rays generated by the light source, the light ray input interface being connected with the light source;

at least two light ray providing unit, the light ray providing unit being at a position on the light source providing board corresponding to the position of the pixel unit on the display panel; and at least one light ray transmittance channel connected with a light ray output interface, for transmitting the first light rays emitted from the light source to the light ray output interface;

wherein the light ray transmittance channel is an optical fiber, and the optical fiber has a coupling interface, which is coupled with the light ray output interface;

wherein the coupling interface and the light ray output interface have a light conductive glue disposed therebetween, the light conductive glue is a transparent glue, and the light conductive glue is used for making the first light rays provided by the optical fiber smoothly transit to the light ray output interface from the coupling interface so as to reduce loss of the first light rays;

wherein the coupling interface and the light ray output interface further have a light leakage preventing layer disposed therebetween, which is a black rubber layer, and the light leakage preventing layer is coated on an external surface of a gap between the coupling interface and the light ray output interface where the light conductive glue is located at.

4. The display device according to claim 3, wherein the light ray providing unit comprises:

the light ray output interface for changing the propagation direction of the first light rays transmitted by the light ray transmittance channel such that the first light rays outputted from the light ray output interface irradiate the pixel unit of the display panel.

5. The display device according to claim 4, wherein the light ray output interface comprises:

a first inclined plane, the first inclined plane and a plane where the light source providing board is located having an angle formed therebetween, the inclined plane being used for reflecting the first light rays transmitted by the optical fiber to the pixel unit;

the first inclined plane being coupled with the coupling interface.

6. The display device according to claim 5, wherein the optical fiber and the light ray output interface have at least one opening therebetween, and the opening is used for outputting the first light rays to the light ray output interface.

7. The display device according to claim 3, wherein the light source providing board has a barrier member disposed therein, and the barrier member is used for blocking the optical fiber so as to fastening the optical fiber.

8. The display device according to claim 3, wherein the light source providing board has a light transmittance, and the light transmittance is adopted within a scope of 10% to 99.9%.

9. A backlight module, comprising:
a light source for generating the first light rays; and
a light source providing board, the light source being disposed at one side of the light source providing board, the light source providing board being used for receiving the first light rays generated by the light source and providing the first light rays for each pixel unit on the display panel, the light source providing board being further used for passing the second light rays irradiating the surface of the light source providing board, wherein the light source providing board comprises:
at least two light ray input interfaces for receiving the first light rays generated by the light source, the light ray input interface being connected with the light source;
at least two light ray providing unit, the light ray providing unit being at a position on the light source providing board corresponding to the position of the pixel unit on the display panel; and
at least one light ray transmittance channel connected with a light ray output interface, for transmitting the first light rays emitted from the light source to the light ray output interface;
wherein the light ray transmittance channel is an optical fiber, and the optical fiber has a coupling interface, which is coupled with the light ray output interface:
wherein the coupling interface and the light ray output interface have a light conductive glue disposed therebetween, the light conductive glue is a transparent glue, and the light conductive glue is used for making the first light rays provided by the optical fiber smoothly transit to the light ray output interface from the coupling interface so as to reduce loss of the first light rays;
wherein the coupling interface and the light ray output interface further have a light leakage preventing layer disposed therebetween, which is a black rubber layer, and the light leakage preventing layer is coated on an external surface of a gap between the coupling interface and the light ray output interface where the light conductive glue is located at.

10. The backlight module according to claim 9, wherein the light ray providing unit comprises:
the light ray output interface for changing the propagation direction of the first light rays transmitted by the light ray transmittance channel such that the first light rays outputted from the light ray output interface irradiate the pixel unit of the display panel.

11. The backlight module according to claim 10, wherein the light ray output interface comprises:
a first inclined plane, the first inclined plane and a plane where the light source providing board is located having an angle formed therebetween, the inclined plane being used for reflecting the first light rays transmitted by the optical fiber to the pixel unit;
the first inclined plane being coupled with the coupling interface.

12. The backlight module according to claim 11, wherein the optical fiber and the light ray output interface have at least one opening therebetween, and the opening is used for outputting the first light rays to the light ray output interface.

13. The backlight module according to claim 9, wherein the light source providing board has a barrier member disposed therein, and the barrier member is used for blocking the optical fiber so as to fastening the optical fiber.

14. The backlight module according to claim 9, wherein the light source providing board has a light transmittance, and the light transmittance is adopted within a scope of 10% to 99.9%.

* * * * *